(12) United States Patent  
Zheng et al.

(10) Patent No.: US 7,925,387 B2
(45) Date of Patent: Apr. 12, 2011

(54) METHOD AND SYSTEMS FOR UTILIZING EXCESS ENERGY GENERATED BY A RENEWABLE POWER GENERATION SYSTEM TO TREAT ORGANIC WASTE MATERIAL

(75) Inventors: Danian Zheng, Simpsonville, SC (US); Robert P. Grimley, Greenville, SC (US); Sumit Bose, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/502,449

(22) Filed: Jul. 14, 2009

(65) Prior Publication Data

US 2010/0138062 A1   Jun. 3, 2010

(51) Int. Cl.
*G06F 19/00* (2006.01)
*G06Q 10/00* (2006.01)

(52) U.S. Cl. .......... 700/291; 700/286; 700/295; 290/44; 290/4 C; 60/39.12

(58) Field of Classification Search .................. 700/291, 700/295, 286; 60/39.12; 290/4 C, 44, 55
See application file for complete search history.

(56) References Cited

U.S. PATENT DOCUMENTS

| 2,180,206 | A  | * | 11/1939 | Honnef ............... 290/4 C |
| 6,182,584 | B1 | * | 2/2001  | Gaudio ................. 110/229 |
| 6,184,427 | B1 |   | 2/2001  | Klepfer et al. |
| 6,797,126 | B2 |   | 9/2004  | Sharivker et al. |
| 7,315,769 | B2 |   | 1/2008  | Balan et al. |
| 7,378,820 | B2 |   | 5/2008  | Liu et al. |
| 7,514,808 | B2 | * | 4/2009  | Wobben ................ 290/41 |
| 2007/0013194 | A1 | * | 1/2007 | Calley ................... 290/44 |
| 2007/0114796 | A1 |   | 5/2007 | Garces et al. |
| 2008/0143304 | A1 |   | 6/2008 | Bose et al. |
| 2009/0062969 | A1 | * | 3/2009 | Chandra et al. ........... 700/291 |
| 2009/0173667 | A1 | * | 7/2009 | Varma ...................... 208/177 |
| 2010/0146927 | A1 | * | 6/2010 | McCutchen et al. ...... 60/39.12 |

* cited by examiner

*Primary Examiner* — Albert Decady
*Assistant Examiner* — Steven R Garland
(74) *Attorney, Agent, or Firm* — James McGinness, Esq.; Armstrong Teasdale LLP

(57) ABSTRACT

A method for using excess energy generated by a renewable power generation system including at least one renewable power generator to treat organic waste material to generate crude oil. The method includes providing a renewable power generation management system operatively coupled to the renewable power generation system. The renewable power generation management system receives operational data from a pump load operatively coupled to the renewable power generator, and/or operational data from an electrical grid operatively coupled to the renewable power generator. Based at least in part on anticipated energy requirements, excess energy is supplied to the pump load to facilitate treating the organic waste material to generate crude oil.

20 Claims, 9 Drawing Sheets

METHOD AND SYSTEMS FOR UTILIZING EXCESS ENERGY GENERATED BY A RENEWABLE POWER GENERATION SYSTEM TO TREAT ORGANIC WASTE MATERIAL

BACKGROUND OF THE INVENTION

The subject matter described herein relates generally to a renewable power generation system and, more particularly, to methods and system for operating a renewable power generation system to provide power to a load.

Renewable power generation systems, for example, wind and solar energy generation systems, offer the advantages of being relatively safe and reliable. Moreover, such technologies have the common advantage of drawing power from sources that are virtually inexhaustible. However, the underlying energy sources such as wind and sunlight, may be subject to periodic swings in availability, such as, for example, varying winds, and/or varying weather patterns that can affect the amount of sunshine received each day.

At least some known wind energy generation systems include one or more wind turbine generators having a rotor with multiple blades. The rotor is sometimes coupled to a housing, or nacelle, that is positioned on top of a base, for example, a truss or tubular tower. At least some known utility grade wind turbines (i.e., wind turbines designed to provide electrical power to a utility grid) have rotor blades having predetermined shapes and dimensions. The rotor blades transform mechanical wind energy into induced blade lift forces that further induce a mechanical rotational torque that drives one or more generators, subsequently generating electric power. The generators are sometimes, but not always, rotationally coupled to the rotor through a gearbox. The gearbox steps up the inherently low rotational speed of the turbine rotor for the generator to efficiently convert the rotational mechanical energy to electrical energy, which is fed into the electric utility grid. Gearless direct drive wind turbine generators also exist.

Typically, wind energy follows a diurnal cycle and annual cycle, wherein the wind speed is generally higher during the night and the winter season, as opposed to during the day and the summer season. While the wind energy is typically more abundant during the night and the winter season, electricity demand during such periods is generally lower than the electricity demand during the day and the summer season. As a result, generally, a wind farm generates more electricity during time periods when there is a lower demand for electricity.

Traditionally, renewable power generation systems rely on utility grids for transferring the generated energy to where it will be used. This may not be the most efficient use of the generated energy from an economic standpoint. As is well known, connecting a wind turbine generator to a utility grid imposes certain constraints on the generator. For example, the power output of the generator must be synchronized with the utility grid supply. When synchronizing generators, the rotor speed of the turbine is controlled to exactly match the utility supply frequency. Another constraint with relying solely on a utility grid as the carrier of generated energy is that there may be a low demand on the grid during the same time periods that there is ample capacity to generate additional power. When this occurs, the energy that could be captured is simply wasted. Although various energy storage systems, such as battery storage systems, can be utilized, such storage systems are relatively expensive and have efficiency losses of their own due to the repeated energy conversions, such that the benefits are outweighed by the costs.

The intermittent nature and variable speed of wind are drawbacks of wind generation systems, which may result in reduced system availability and reduced penetration. One popular way to store wind energy is using a small hydro plant to pump water to a higher reservoir. However, this requires special geological features and a large investment. There is a need to efficiently use and/or store the electricity generated by a wind farm during these low demand and "off-peak" times. Existing solutions to the intermittency problem of wind power generation devices, such as through the use of energy storage systems, have traditionally either been cost prohibitive or have low energy efficiency. Another way to mitigate intermittency and increase system availability is to use wind generation in parallel with other generating sources, which can be complimentary to the wind. However, such systems are also expensive.

BRIEF DESCRIPTION OF THE INVENTION

In one aspect, a method is provided for using excess energy generated by a renewable power generation system including at least one renewable power generator to treat organic waste material to generate crude oil. A renewable power generation management system is operatively coupled to the renewable power generation system. The renewable power generation management system receives operational data from a pump load operatively coupled to the renewable power generator. The operational data from the pump load is related to at least one of current energy requirements and anticipated energy requirements for treating the organic waste material. The renewable power generation management system also receives operational data from an electrical grid operatively coupled to the renewable power generator. The operational data received from the electrical grid includes data related to at least one of a current electrical distribution load and an anticipated electrical distribution load. Based at least in part on anticipated energy requirements, a determination is made as to an amount of excess energy to supply to the pump load to facilitate treating the organic waste material to generate crude oil. The determined amount of excess energy is supplied to the pump load.

In a further aspect, a renewable power generation management system is provided. The renewable power generation management system is configured to facilitate utilization of excess energy generated by a renewable power generation system including at least one renewable power generator to treat organic waste material to generate crude oil. The renewable power generation management system includes a controller programmed to: receive operational data from a pump load operatively coupled to the renewable power generator, the operational data related to at least one of current energy requirements and anticipated energy requirements for treating the organic waste material; receive operational data from an electrical grid operatively coupled to the renewable power generator, the operational data related to at least one of a current electrical distribution load and an anticipated electrical distribution load; determine based at least in part on anticipated energy requirements an amount of excess energy to supply to the pump load to facilitate treating the organic waste material to generate crude oil; and operate the renewable power generator to generate power based at least in part on the anticipated energy requirements and the anticipated electrical distribution load.

In another aspect, a renewable power generation system is configured to utilize excess energy to treat organic waste material to generate crude oil. The renewable power generation system includes at least one renewable power generator configured to generate electrical energy. A pump load is operatively coupled to the renewable power generator and configured to receive excess energy generated by the renewable power generator. The renewable power generation system includes a controller programmed to: receive operational data from the pump load related to at least one of current energy requirements and anticipated energy requirements for treating the organic waste material; receive operational data from an electrical grid operatively coupled to the renewable power generator related to at least one of a current electrical distribution load and an anticipated electrical distribution load; determine based at least in part on anticipated energy requirements an amount of excess energy to supply to the pump load to facilitate treating the organic waste material to generate crude oil; and operate the renewable power generator to generate electrical energy based at least in part on the anticipated energy requirements and the anticipated electrical distribution load.

BRIEF DESCRIPTION OF THE DRAWINGS

The present disclosure is described in detail below with reference to the attached figures.

DETAILED DESCRIPTION OF THE INVENTION

Figure 1:
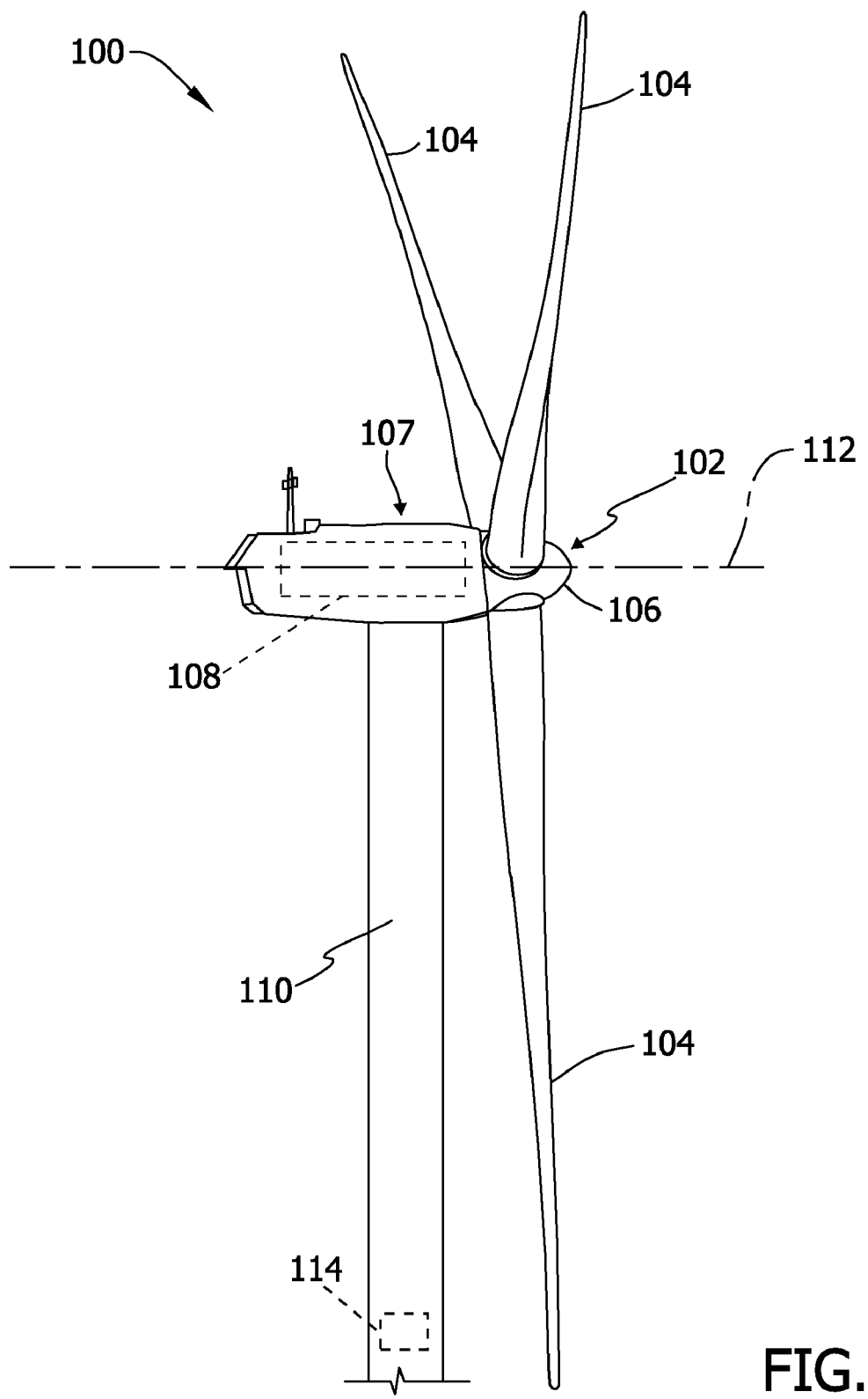
FIG. 1 is a side perspective view of an exemplary wind turbine.

The embodiments described herein relate to a system and a method for utilizing excess energy generated by a renewable power generation system including at least one renewable power generator to treat organic waste material to generate crude oil. Renewable energy sources include, without limitation, wind and solar energy sources.

In one embodiment, excess energy generated by a renewable power generation system including at least one renewable power generator is supplied to a waste management site, such as a waste management facility or plant, to treat organic waste material, such as by cracking plastic and other organic waste material with microwave energy to generate crude oil. A renewable power generation management system receives operational data from each renewable power generator of the renewable power generation system as well as operational data from the waste management site and/or each pump load located at the waste management site that is operatively coupled to the renewable power generation system.

In the exemplary embodiment, each renewable power generator may include a wind turbine and/or a solar panel as described herein. The operational data from the renewable power generation system and/or each renewable power generator may include, without limitation, information or data related to current power generation and/or anticipated power generation, a number of operational renewable power generators within the renewable power generation system available to generate useable electrical energy, a maximum power generation of each renewable power generator and/or of the renewable power generation system, heating requirements of the renewable power generator, cooling requirements of the renewable power generator, current climate conditions, and/or a climate conditions forecast.

The operational data from the waste management site and/or from each pump load located at the waste management site may include information or data related to current energy requirements and/or anticipated energy requirements for treating the organic waste material including, without limitation, information or data related to current energy requirements and/or anticipated energy requirements, a quantity of untreated organic waste material at the waste management site, a market demand for crude oil, a waste disposal cost, a cost for supplying required electricity to the waste management site, and a market pricing for crude oil.

In addition, the renewable power generation management system also receives operational data from an electrical grid that is operatively coupled to the renewable power generator and configured to receive electrical energy from the renewable power generation system for distribution throughout a geographical location. The operational data received from the electrical grid may include, without limitation, information or data that is related to a current electrical distribution load and/or an anticipated electrical distribution load including, without limitation, information or data related to current climate conditions, a climate conditions forecast, a maximum capacity of the electrical grid, energy distribution demands at peak hours and non-peak hours, energy distribution demands at a selected time of day, energy distribution demands on a selected day of the week, and seasonal energy distribution demands.

Based at least in part on anticipated energy requirements of the waste management site and/or the anticipated electrical distribution load of the electrical grid, the renewable power generation management system determines an amount of excess energy to supply to the waste management site and the pump load to facilitate treating the organic waste material to generate crude oil, and supplies the determined amount of excess energy to the pump load. Further, the renewable power generation management system is configured to generate and transmit to each renewable power generator command signals to control an amount of power generated by the renewable power generator based at least in part on the anticipated energy requirements and the anticipated electrical distribution load.

The renewable power generation management system provides an interface between the renewable power generation system and a load, such as an electrical grid and/or a waste management site configured to treat plastic and other organic waste material with microwave energy to produce crude oil, or another plant or facility that requires electrical power. In the exemplary embodiment, the renewable power generation management system includes a controller communicatively coupled to the renewable power generation system including one or more wind turbines and/or one or more solar panels configured to generate electrical energy. The controller is also communicatively coupled to the electrical grid and the waste management site, as well as one or more internal and/or external databases or memory areas within the renewable power generation management system. For example, the controller may receive from one or more wind turbines data including, without limitation, current environmental conditions, a current wind power, current component heating or cooling needs, and/or a wind or climate forecast. Further, the controller may receive from the waste management site a waste forecast including a quantity of untreated waste material, a time constraint for treating the quantity of waste material, such as a day, a week, or a month, and the anticipated electrical energy requirements for treating the quantity of waste material. Additionally, the controller may receive from an internal source and/or an external source data including, without limitation, an electrical distribution load, a current temperature and/or a maximum capacity of the renewable power generation system. Such data may also include power demands for certain time intervals throughout a day, including peak hours and non-peak hours, as well as a cost of electricity, a cost of crude oil, a cost of waste material disposal, and/or an amount of thermal energy stored at the renewable power generation system and/or the waste management site to facilitate determining an amount of electrical energy generated by the renewable power generation system to be distributed to the electrical grid and/or to the waste management site.

In response to the data received, the controller is configured to generate and transmit control commands to the renewable power generation system and/or each renewable power generator, the electrical grid and/or the waste management site and/or the pump load. For example, in one embodiment, the controller may receive data from the waste management site related to an amount of electrical energy required to treat a determined amount of waste material. In response to this data, the controller may transmit to the renewable power generation system, and/or to each renewable power generator independently, control commands to control the wind power or solar power generation by the renewable power generation system.

In the exemplary embodiment described herein, excess electrical energy generated by the renewable power generation system may be used to treat organic waste material by cracking plastic and other organic waste material with microwave energy to generate crude oil, for example. The crude oil then becomes a form of storable energy that may be refined to gasoline and other petroleum products. Organic waste material microwave cracking technology requires a large amount of electricity and, thus, this process may efficiently utilize the excess power generation capacity of wind energy generation systems, such as wind power generators, and/or solar energy generation systems at a low demand and "off-peak" time, as an alternative to storing excess electrical energy generated by the renewable power generation system during the low demand and "off-peak" time. Additionally, and advantageously, in the embodiments described herein, environmentally hazardous organic waste materials are treated and recycled rather than buried or burned. By treating organic waste materials with microwave energy to crack the long molecules into shorter crude oil molecules, energy generated by the renewable power generation system is efficiently utilized, rather than stored, and the environmental concerns with waste materials are resolved. Further, this process provides an energy form that may be stored and/or transported. Although in the embodiments described herein, excess electrical energy generated by the renewable power generation system is used to treat organic waste material at a waste management site, it should be apparent to those skilled in the art that the excess energy may be supplied to any suitable load, such as a plant or a facility that requires electrical power to operate its equipment, for example.

The following description will be better understood when read in conjunction with the appended figures. To the extent that the figures show diagrams of the functional blocks of various embodiments, the functional blocks are not necessarily indicative of the division between hardware circuitry. Thus, for example, one or more of the functional blocks (e.g., processors or memory) may be implemented in a single piece of hardware (e.g., a general purpose signal processor or a block or random access memory, hard disk, or the like). Similarly, the programs may be stand alone programs, may be incorporated as subroutines in an operating system, may be functions in an installed software package, and the like. It should be understood that the various embodiments are not limited to the arrangements and the instrumentality shown in the figures.

FIG. 1 is a side perspective view of an exemplary wind turbine 100. In the exemplary embodiment, wind turbine 100 is a horizontal axis wind turbine generator. In an alternative embodiment, wind turbine 100 may be a vertical axis wind turbine generator. As used herein, the terms "wind turbine" and "wind turbine generator" are used interchangeably, and are representative of any device that converts wind energy to electrical energy and, more specifically, converts kinetic energy of wind into mechanical energy that generates electricity using a generator. Wind turbine 100 includes a rotor 102 that includes a plurality of rotor blades 104 coupled to a rotatable hub 106. Wind turbine 100 also includes a nacelle 107 that houses a generator 108 therein and that is coupled to rotatable hub 106. In the exemplary embodiment, rotor 102 includes three rotor blades 104. Alternatively, rotor 102 may include any suitable number of rotor blades 104 that enables wind turbine 100 to function as described herein. In the exemplary embodiment, generator 108 is coupled to a support tower 110 that supports wind turbine 100 during operation.

In the exemplary embodiment, wind forces act upon rotor blades 104 causing rotor 102 to rotate about an axis 112 of generator 108 and generate electrical power. In the exemplary embodiment, stresses created by the force of the wind upon rotor blades 104, hub 106, generator portion 108, and support tower 110, as well as operational parameters such as power output and temperature, are measured by one or more sensors and/or determined by one or more programmable logic controllers (PLC) as described below, and the resulting measured and/or determined operational data, is transmitted to a renewable power generation management system, such as a wind power generation system 200 shown in FIGS. 2 and 3 for example.

In the exemplary embodiment, each wind turbine 100 includes a control system 114, shown in FIGS. 1, 2, 3, and 7, that is operatively coupled, such as in signal communication, with wind power generation system 200 to facilitate controlling operation of corresponding wind turbine 100. Control system 114 is shown as being positioned on or within tower 110, such as at a base of tower 110. However, in alternative embodiments, control system 114 or at least a portion of control system 114 is centralized within nacelle 107 or is a distributed system throughout wind turbine 100, within a wind farm, and/or at a remote control center, such as at wind power generation system 200. Control system 114 includes a processor configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system or controller can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Further, the input channels described herein may include, without limitation, sensors and/or computer peripherals associated with an operator interface, such as a mouse and a keyboard, and the output channels described herein may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a PLC cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, flow control system control commands. The execution of sequences of instructions is not limited to any specific combination of hardware circuitry and software instructions.

Control system 114 is operatively coupled to one or more components of wind turbine 100, such as in operational control communication, to monitor and/or control operation of wind turbine 100. Control system 114 includes one or more sensors that are configured to measure environmental conditions, such as a wind speed, a direction or wind, and various climate conditions, as well as a speed of rotation of rotor blades 104, for example. The sensors provide feedback of the measured environmental and/or operational conditions to control system 114.

Figure 2:
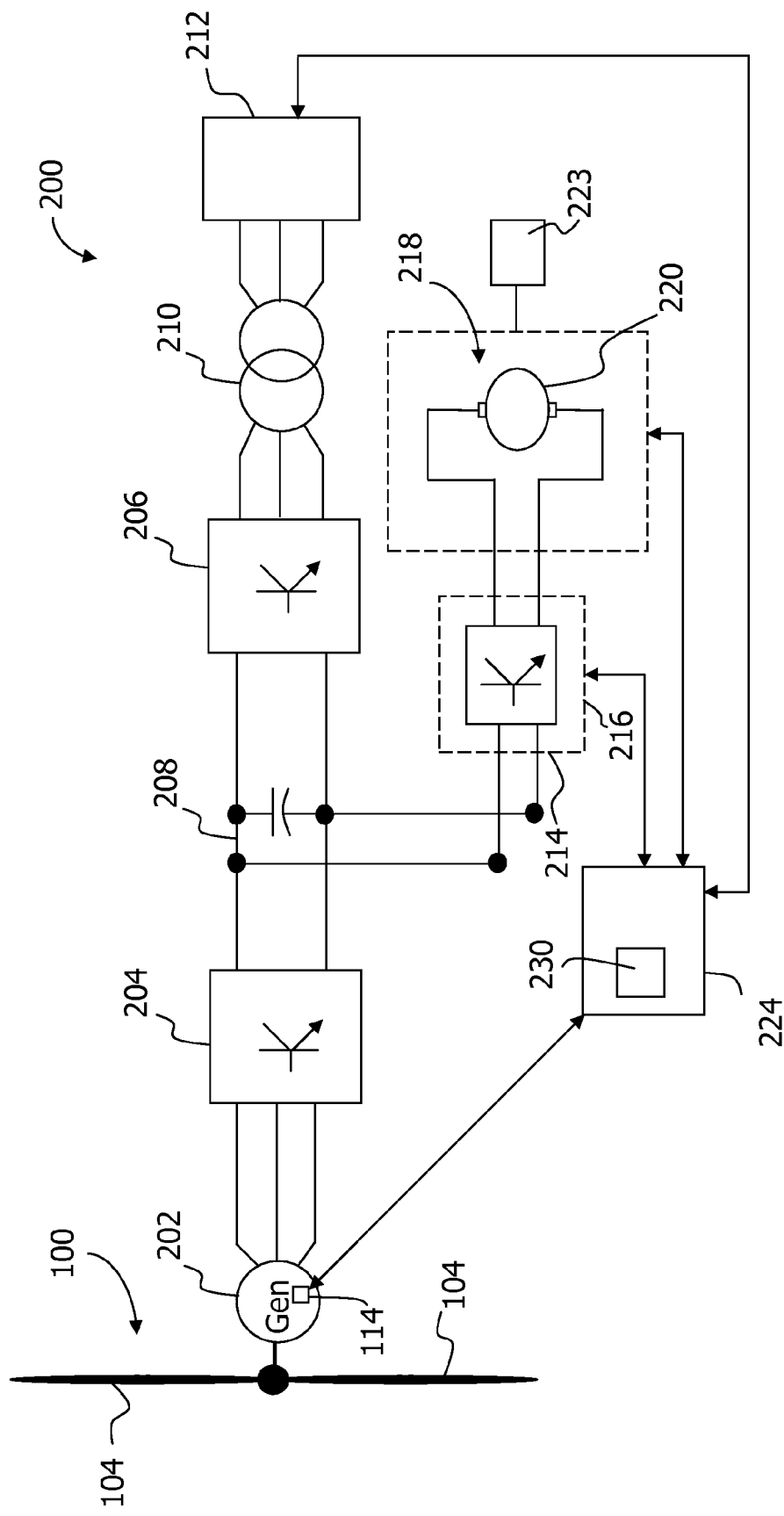
FIG. 2 is a schematic block diagram of an exemplary wind power generation system.

FIG. 2 is a schematic block diagram of an exemplary renewable power generation system, namely wind power generation system 200. Wind power generation system 200 includes one or more wind power generators 202 operatively coupled to or including, for example, one or more wind turbines 100, as a renewable power source. An AC/DC converter 204 is electrically coupled to wind power generator 202 and a DC/AC converter 206 is electrically coupled to AC/DC converter 204. A DC link 208 is electrically coupled to wind power generator 202 and coupled between AC/DC converter 204 and DC/AC converter 206. DC/AC converter 206 is electrically coupled to a transformer 210 which is electrically coupled to an electrical grid 212. In certain embodiments, electrical grid 212 includes a microgrid including, for example, electrical generators, loads, and storage devices. Electrical grid 212 supplies power or distributes electrical energy, for example, to shopping centers, industrial parks, college campuses, city neighborhoods, towns and/or villages. DC link 208 is also electrically coupled to a pump load 214 including a bi-directional DC-DC converter 216 that is electrically coupled to a load 218. In the exemplary embodiment, load 218 includes DC motor 220 located at a waste management site 222, such as a remotely located waste management plant or facility. In one embodiment, wind power generation system 200 includes a thermal energy storage device 223 configured to store excess energy not required by pump load 214.

In the exemplary embodiment, wind power generator 202 generates a first AC voltage. AC-DC converter 204 converts the first AC voltage to a first DC voltage wherein at least a portion of the first DC voltage is transmitted to electrical grid 212. In one embodiment, DC/AC converter 206 converts a portion of the first DC voltage from AC/DC converter 204 to a second AC voltage which is then transmitted through transformer 210 to electrical grid 212. Bi-directional DC-DC converter 216 converts a portion of the first DC voltage from AC/DC converter 204 received through DC link 208 to a second DC voltage and supplies the second DC voltage to DC motor 220. In one embodiment, as shown in FIG. 2, bi-directional DC-DC converter 216 is electrically coupled to wind power generator 202 and coupled between AC/DC converter 204 and DC/AC converter 206.

In the exemplary embodiment, a suitable renewable power generation management system, namely a wind power generation management system 224 is operatively coupled, such as in signal communication, with one or more wind power generators 202. As shown in FIG. 2, wind power generation management system 224 is operatively coupled, such as in signal communication, with control system 114 of each wind turbines 100. Further, wind power generation management system 224 may be operatively coupled, such as in signal communication, with one or more additional components of wind power generation system 200, including electrical grid 212, pump load 214, and/or waste management site 222. Wind power generation management system 224 is configured to monitor and/or control operation of the one or more wind power generators 202, including corresponding wind turbines 100, collectively or independently, for example to supply sufficient power to pump load 214. Wind power generation management system 224 includes a controller 230 that is operatively coupled to each wind power generator 202. In alternative embodiments, controller 230 is directly or indirectly coupled to one or more components of wind power generation system 200.

Figure 3:
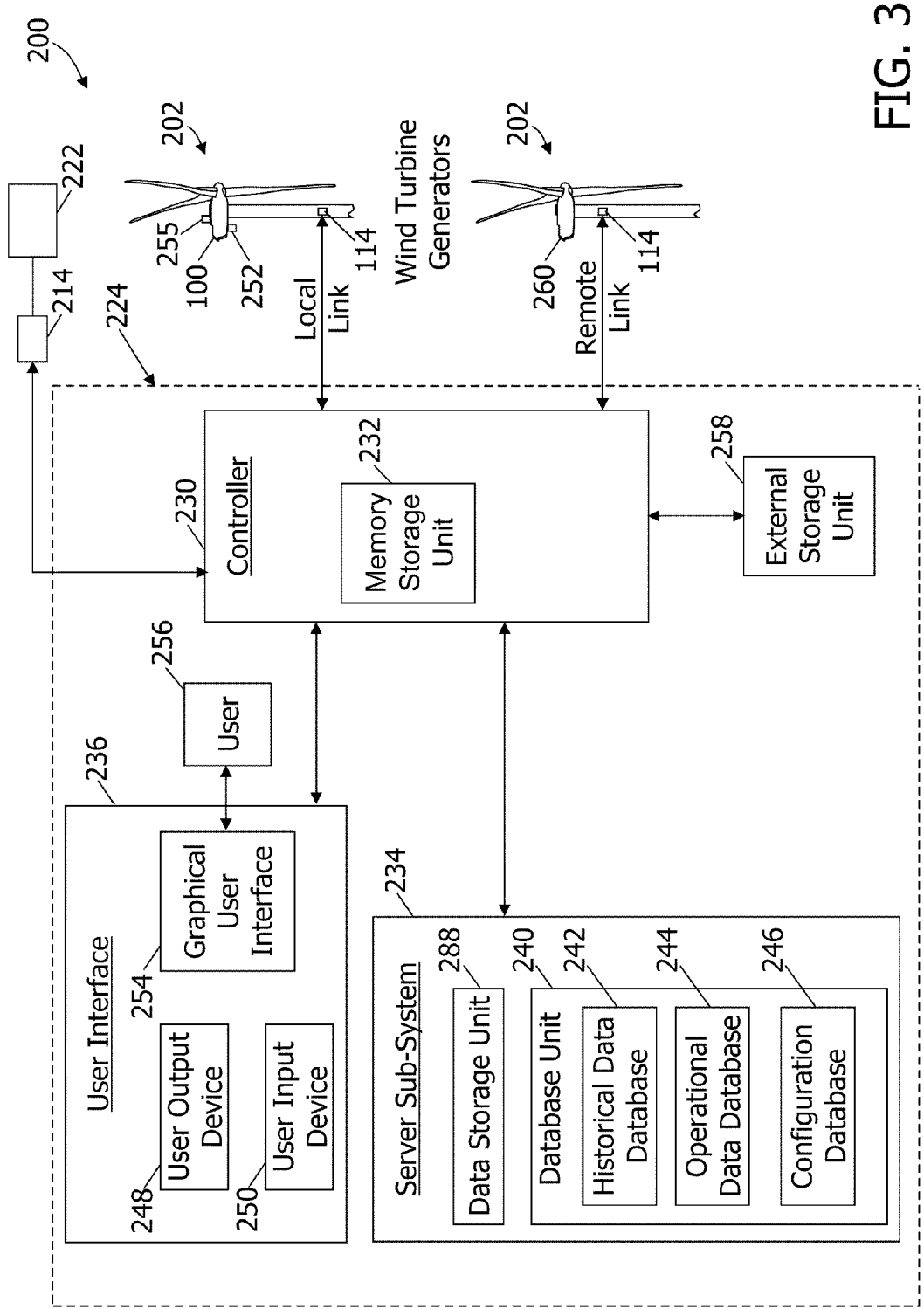
FIG. 3 is a schematic block diagram of an exemplary wind power generation management system for monitoring operation of a wind power generation system.

Referring further to FIG. 3, in the exemplary embodiment, a renewable power generation system, such as wind power generation system 200, is configured to utilize excess energy generated by wind power generation system 200 to treat organic waste material to generate crude oil. Wind power generation system 200 includes one or more wind power generators 202 configured to generate electrical energy. Pump load 214 is operatively coupled to the wind power generators 202 and is configured to receive the excess energy generated by wind power generators 202. Controller 230 is programmed to receive operational data from pump load 214 related to current energy requirements and/or anticipated energy requirements at waste management site 222 for treating the organic waste material. Controller 230 is also programmed to receive operational data from electrical grid 212, operatively coupled to wind power generation system 200, related to a current electrical distribution load and/or an anticipated electrical distribution load.

Based at least in part on the anticipated energy requirements, controller 230 is programmed to determine an amount of excess energy to supply to pump load 214 to facilitate treating the organic waste material to generate crude oil. In a particular embodiment, controller 230 is further programmed to consider current loads, a load forecast, market conditions, current thermal energy storage, and/or thermal energy storage capacity to determine based at least in part on anticipated energy requirements an amount of excess energy to transmit to pump load 214. Controller 230 is further programmed to operate wind power generators 202 to generate electrical energy based at least in part on the anticipated energy requirements and the anticipated electrical distribution load. For example, in one embodiment, controller 230 is programmed to operate bi-directional DC-DC converter 216 to supply the determined amount of excess energy to load 218. Controller 230 is further programmed to generate and transmit to each wind power generator 202 command signals to control an amount of electrical energy generated by each wind power generator 202 based at least in part on the anticipated energy requirements and the anticipated electrical distribution load.

As shown in FIG. 3, in one embodiment, wind power generation system 200 includes wind power generation management system 224 having controller 230 for use in monitoring operation of each wind power generator 202 and/or each wind turbine 100. In the exemplary embodiment, controller 230 includes a memory storage unit 232 that stores information and data used by controller 230 to operate, to retrieve, and/or to store operational data related to each wind turbine 100. In various embodiments, memory storage unit 232 may include internal and/or external storage such as a hard drive, Read Only Memory (ROM), Random Access Memory (RAM), or any other suitable device known to those skilled in the art for performing the functions as described herein.

Controller 230 is communicatively coupled to a server sub-system 234 and to a user interface device 236 that includes an input and an output. In the exemplary embodiment, server sub-system 234 includes a data storage unit 238 and a database unit 240. In one embodiment, data storage unit 238 and database unit 240 receive data from controller 230, store the received data, receive requests for stored data, and/or retrieve stored data in response to the received requests. In a particular embodiment, data storage unit 238 includes a supervisory control and data acquisition (SCADA) system configured to acquire operational data from wind power generation system 200 and/or one or more operating wind turbines 100 and transmit the acquired operational data to controller 230. Further, database unit 240 stores and retrieves data based on requests received from controller 230 for data stored in one or more databases, such as in a historical data database 242, in an operational data database 244, and in a configuration database 246 that includes configuration data for each wind turbine 100. In the exemplary embodiment, user interface device 236 outputs data through a user output device 248 and receives data through a user input device 250.

Moreover, in the exemplary embodiment, the operational data received by controller 230 from operating wind turbine 100 may include data from one or more sensors 255 and/or one or more programmable logic controllers (PLC) 252 each positioned on or with respect to wind turbine 100, such as measurements representative of the present operational status of various components of wind turbine 100. As described above, the operational data may include, without limitation, information or data related to current power generation and/or anticipated power generation, a number of operational renewable power generators within the renewable power generation system available to generate useable electrical energy, a maximum power generation of each renewable power generator and/or of the renewable power generation system, heating requirements of the renewable power generator, cooling requirements of the renewable power generator, current climate conditions, and/or a climate conditions forecast, as well as a temperature of one or more wind turbine component, a power output of wind power generator 202, stresses or forces acting upon one or more wind turbine component, and/or any other suitable measurement. In one embodiment, user interface 236 outputs the operational data via user output device 248 using at least one of a visual display, a graphical user interface (GUI) 254, a hardcopy device, and/or an audio device. Further, in addition to the operation of controller 230 using operational data, controller 230 may also transmits to server sub-system 234 requests for historical data associated with one or more wind turbines 100, and receives historical data in response to such requests.

In the exemplary embodiment, as shown in FIG. 3, wind power generation management system 224 receives through user interface device 236 input from a user 256 via GUI 254 and that receives input from other than user 256 via user input device 250. In an alternative embodiment, controller 230 is coupled to an external storage unit 258 for storage and retrieval of operational data, similar to the function of internal memory storage unit 232. Moreover, in a further alternative embodiment, wind power generation management system 224 enables user 256 to amass operational data for use in monitoring and/or controlling operation of wind power generation system 200. In a further alternative embodiment, wind power generation management system 224 is communicatively coupled to an operating wind turbine 260 that is located remotely from wind turbine 100. In such an embodiment, the ability of wind power generation management system 224 to monitor remote operating wind turbine 260 in the same manner as local operating wind turbine 100, enables an operator to monitor wind turbine farms, during operation, that are remotely located from wind power generation management system 224. Such a feature enables centralized monitoring of multiple disparate wind turbine farms, in such an embodiment.

In one embodiment, wind power generation management system 224 is configured to facilitate utilization of excess energy generated by wind power generation system 200 including wind power generator 202 to treat organic waste material to generate crude oil. During the treatment process of organic waste material, as described in greater detail below, plastic waste material as well as other suitable organic waste material is cracked with microwave technology to produce crude oil that can be refined into useable fuel. In this embodiment, wind power generation management system 224 includes controller 230 programmed to receive operational data from pump load 214 operatively coupled to wind power generator 202. The operational data is related to current energy requirements and/or anticipated energy requirements for treating the organic waste material. Controller 230 is further programmed to receive operational data from electrical grid 212 operatively coupled to wind power generator 202. The operational data is related to a current electrical distribution load and/or an anticipated electrical distribution load. Controller 230 is programmed to determine, based at least in part on anticipated energy requirements, an amount of excess energy to supply to pump load 214 to facilitate treating the organic waste material to generate crude oil, and operate wind power generator 202 to generate electrical energy based at least in part on the anticipated energy requirements and/or the anticipated electrical distribution load. Controller 230 is further programmed to supply the determined amount of excess energy to pump load 214. In a particular embodiment, controller 230 is further programmed to operate bi-directional DC-DC converter 216, shown in FIG. 2, or a bi-directional inverter operatively coupled to a renewable power generator as described in greater detail below to supply the determined amount of excess energy to pump load 214. Controller 230 is further programmed to consider current loads, a load forecast, market conditions, current thermal energy storage, and thermal energy storage capacity to determine based at least in part on anticipated energy requirements an amount of excess energy to transmit to pump load 214. Controller 230 then generates and transmits to one or more wind power generators 202 command signals to control an amount of power generated by each wind power generator 202 based at least in part on the anticipated energy requirements and the anticipated electrical distribution load.

Figure 4:
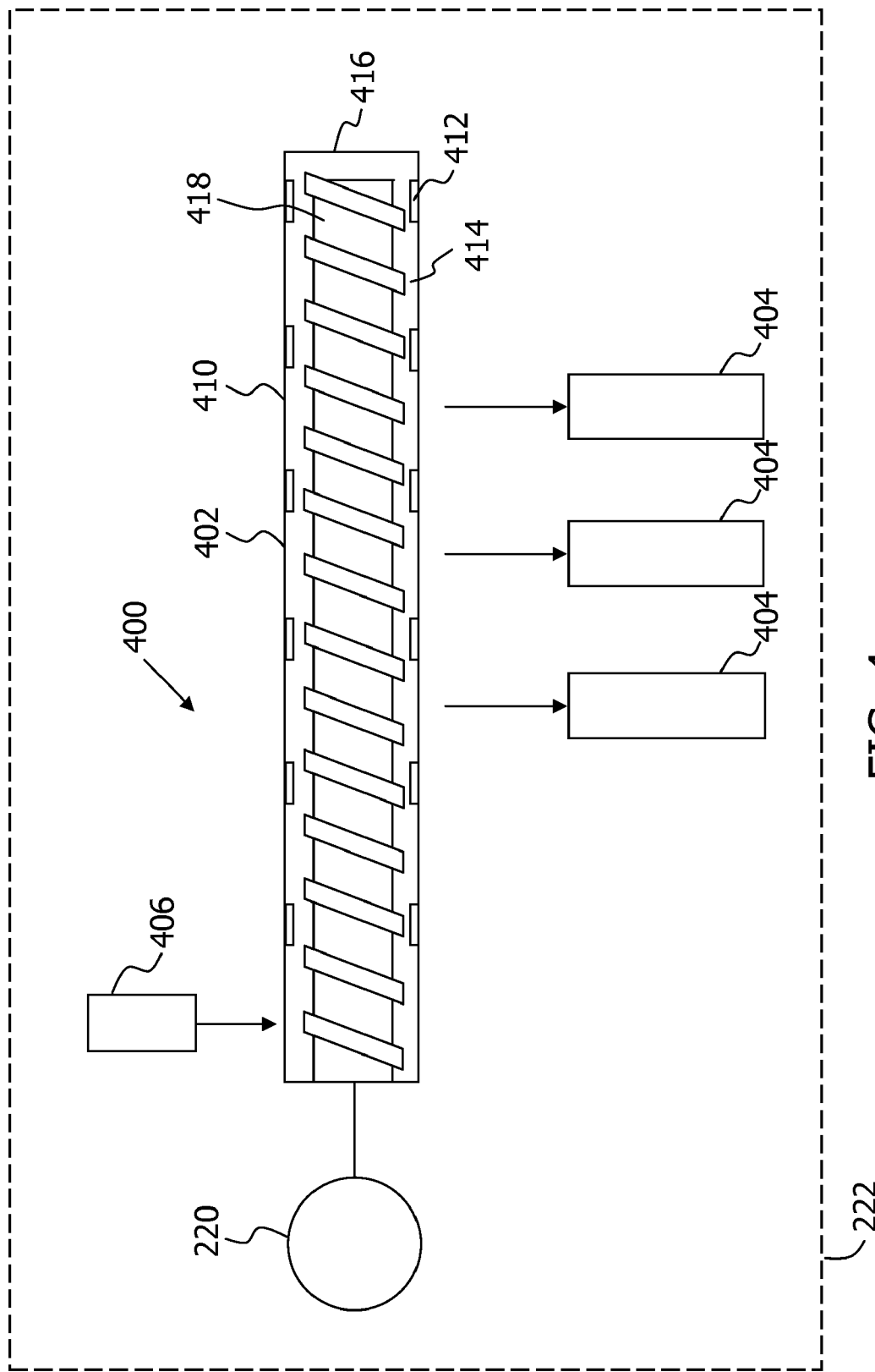
FIG. 4 is a schematic block diagram of an exemplary load.

FIG. 4 is a schematic block diagram of an exemplary waste management site 222 including a microwave cracking reactor unit 400 powered by DC motor 220, referred to above with reference to FIG. 2. Referring to FIG. 4, excess electrical energy generated utilizing a renewable power generator system, such as a suitable wind power generation system or a suitable solar power generation system as described herein, may be supplied to microwave cracking reactor unit 400 by DC motor 220. DC Motor 220 is operatively coupled to an extruder/separator 402 of microwave cracking reactor unit 400 and configured to supply electrical energy to extruder/separator 402 to drive or rotate extruder/separator 402. DC Motor 220 is configured to supply electrical energy to one or more components of microwave cracking reactor unit 400 in addition to or as an alternative to extruder/separator 402. At least one microwave cracking reactor 404 is coupled in communication with extruder/separator 402. An organic waste material feeder 406 feeds waste feed material into extruder/separator 402, wherein plastic material contained in the waste feed material is separated from non-plastic material. In this embodiment, the waste feed material may include, without limitation, non-plastic contaminants, such as paper, pieces of metal and wood, and plastic material having various compositions of polymers which undergo different cracking reactions. Separated plastic material is then extruded into one or more cracking reactors 404, wherein the plastic material undergoes a microwave cracking process.

In the exemplary embodiment, extruder/separator 402 includes a main extruder 410 that functions as a separator. Extruder/separator 402 also includes one or more sections that have openings 412 in a wall 414 of extruder/separator 402. A diameter and a location of each opening 412, as well as a distribution of openings 412 enables the molten plastic material to be extruded such that the solid pieces and particles remain inside extruder/separator 402. Non-plastic material in the waste feed material (paper labels, pieces of metal, wood, fabric, glass, etc.) is removed towards an end 416 of extruder/separator 402 since the non-plastic material does not pass through openings 412. A main screw conveyor 418 has blades which facilitate cleaning openings 412 and removing plugging material. Plastic material extruded at a particular section of main screw conveyor 418 is mixed with specific catalysts and additives and is supplied to a separate cracking reactor 404. In some applications, the material extruded at different sections is mixed together and is processed in one cracking reactor 404.

Plastic material that is mixed with a sensitizer, catalyst and additive, is extruded into cracking reactor 404 in the form of strands or sheets, for example, to facilitate increasing a surface area and/or to increase a thickness of the material into a desired range of the penetration depth for the microwave/radio frequency power. Within cracking reactor 404, the material undergoes thermal/catalytic cracking under microwave irradiation.

Figure 5:
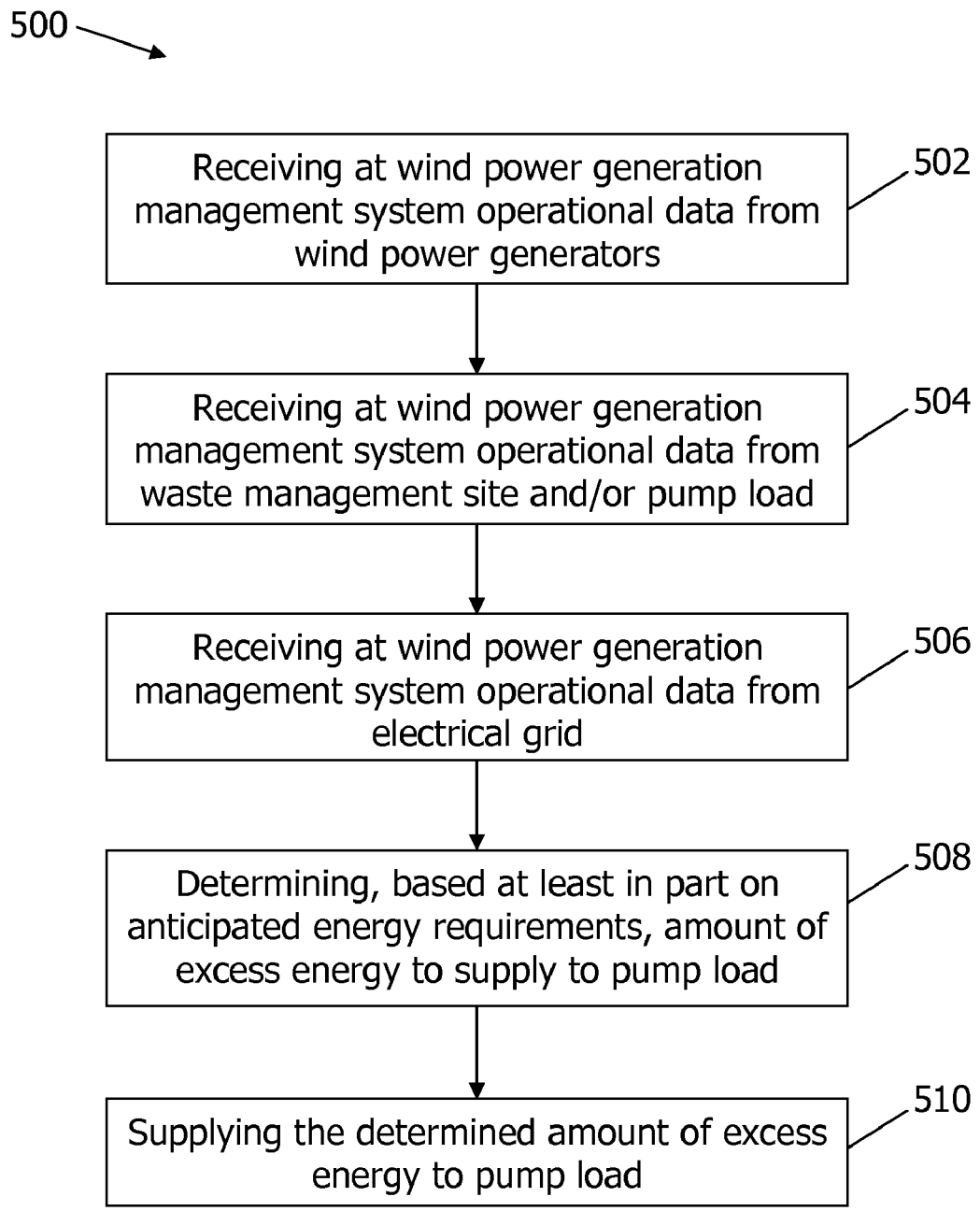
FIGS. 5 and 6 is a flow chart of an exemplary method for operating a renewable power generation system to transfer power to a load.

FIG. 5 is a flow chart of an exemplary method 500 for using excess energy generated by a renewable power generation system including at least one renewable power generator to treat organic waste material to generate crude oil. In one embodiment, the renewable power generation system includes a suitable controller to control operation of the renewable power generation system. The controller determines an amount of electrical power to utilize and store.

In one embodiment as shown in FIG. 5, method 500 includes receiving 502 at wind power generation management system 224 operational data from one or more wind power generators 202. In one embodiment, the operational data received from wind power generator 202 includes data related to current power generation and/or anticipated power generation, a number of operational renewable power generators, a maximum power generation, heating requirements of the renewable power generator, cooling requirements of the renewable power generator, current climate conditions, and/or a climate conditions forecast.

Wind power generation management system 224 also receives 504 operational data from waste management site 222 and/or pump load 214 operatively coupled to wind power generator 202. The operational data received from pump load 214 is related to current energy requirements and/or anticipated energy requirements for treating the organic waste material at waste management site 222. The operational data from pump load 214 may include data related to current energy requirements and/or anticipated energy requirements, a quantity of organic waste material, crude oil demand, waste disposal cost, electricity cost, and crude oil pricing.

Wind power generation management system 224 also receives 506 operational data from electrical grid 212 operatively coupled to wind power generator 202. The operational data received from electrical grid 212 is related to a current electrical distribution load and/or an anticipated electrical distribution load. The operational data received from electrical grid 212 may include data related to current climate conditions, a climate conditions forecast, a maximum capacity of the electrical grid, energy demands at peak hours and non-peak hours, energy demands at a selected time of day, and/or energy demands on a selected day.

Based at least in part on anticipated energy requirements, wind power generation management system 224 determines 508 an amount of excess energy to supply to pump load 214 to facilitate treating the organic waste material to generate crude oil. The determined amount of excess energy is supplied 510 to pump load 214. In a particular embodiment, controller 230 maintains a sufficient supply of electrical energy to waste management site 222 to ensure that a minimum temperature within microwave cracking reactor unit 400 is maintained to prevent the organic waste material from cooling if the electrical energy is supplied to electrical grid 212.

Figure 6:
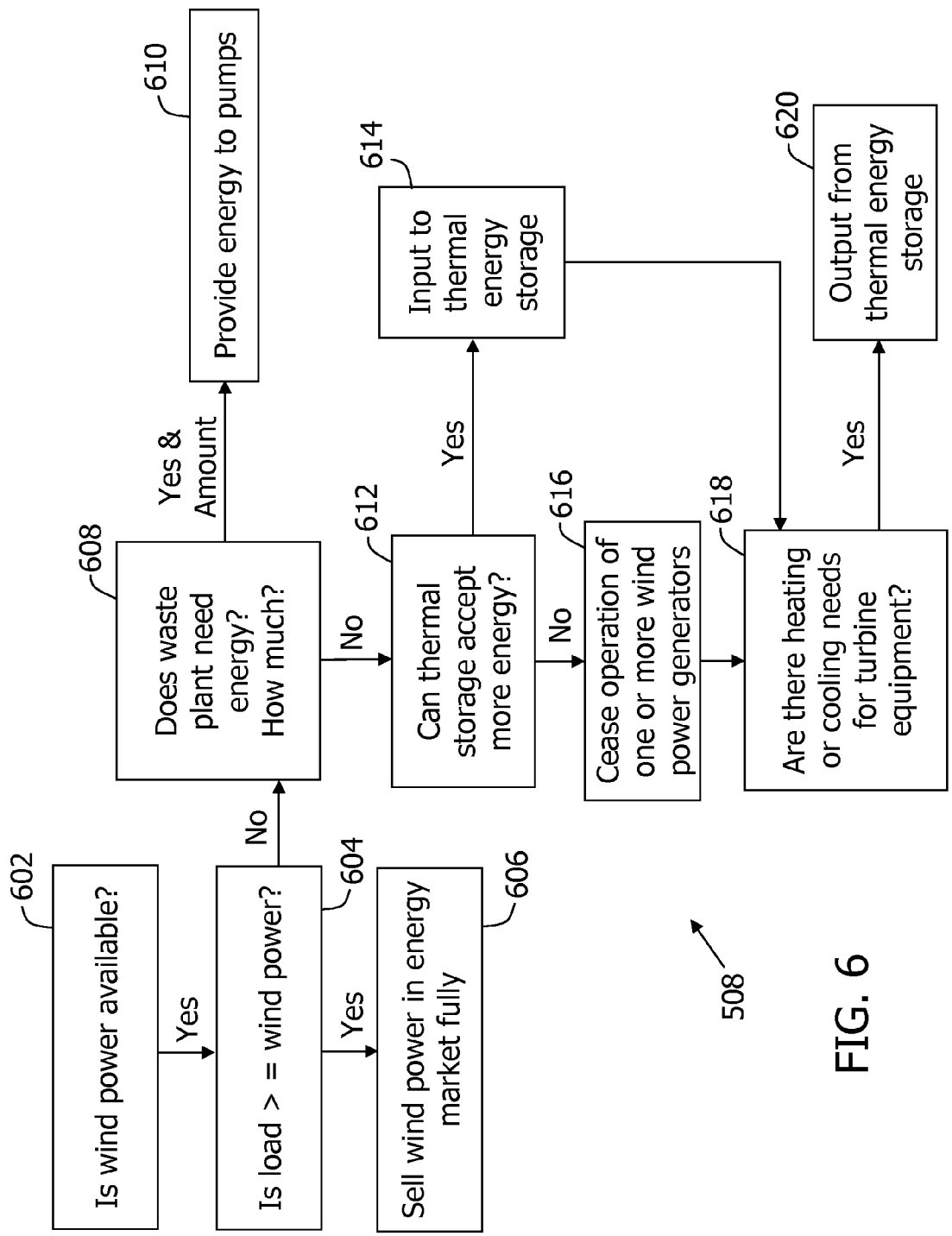

Referring further to FIG. 6, to facilitate determining 508 an amount of excess energy to supply to pump load 214 based at least in part on anticipated energy requirements, an amount of renewable power generated by the renewable power generator is quantified. In this embodiment, a determination is made 602 whether wind power is available. If wind power is available, a determination is made 604 whether the current or anticipated electrical distribution load required by electrical grid 212 is equal to or greater than the available wind power. If the current or anticipated electrical distribution load required by electrical grid 212 is equal to or greater than the available wind power, the wind power is sold 606 in the energy market. A decision to sell the available wind power at this point may be driven by market considerations and/or forecast input.

If the current or anticipated electrical distribution load required by electrical grid 212 is less than the available wind power, a determination is made 608 whether waste management site 222 currently requires the excess energy and/or is anticipated to require the excess energy for treating the organic waste material. In one embodiment, an amount of energy required by pump load 214 to treat the organic waste material is quantified. If it is determined that the current or anticipated energy requirements of waste management site 222 are not satisfied, the excess energy generated by wind power generation system 200 is supplied 610 to pump load 214. A decision to supply the excess energy at this point may be driven by market considerations and/or forecast input. For example, current energy requirements and anticipated energy requirements, a quantity of organic waste material, crude oil demand, waste disposal cost, electricity cost, and crude oil pricing may be considered when determining whether to supply the excess energy to waste management site 222.

However, if it is determined that the current or anticipated energy requirements of waste management site 222 are satisfied, a determination is made 612 whether the excess energy can be stored within a suitable thermal storage unit or device. If the thermal storage unit or device has capacity for storing the excess energy not supplied to or required by waste management site 222, the excess energy is input 614 to the thermal storage unit or device. In a particular embodiment, a determination may be made 618 as to whether any component of wind power generator 202 requires any heating or cooling.

If the thermal storage unit or device does not have capacity for storing the excess energy not supplied to or required by waste management site 222, wind power generation management system 224 may cease operation 616 of one or more wind power generators 202. Alternatively, or in addition, the determination may be made 618 as to whether any component of wind power generator 202 requires any heating or cooling. If one or more components require heating or cooling, a suitable amount of energy is output 620 from the thermal energy storage unit or device to facilitate heating or cooling the component(s).

In a particular embodiment, to determine 508, based at least in part on anticipated energy requirements, an amount of excess energy to supply to pump load 214 wind power generation management system 224 considers current loads, a load forecast, market conditions, current thermal energy storage, and/or thermal energy storage capacity. Further, wind power generation management system 224 is configured to generate and transmit to wind power generator 202 command signals through controller 230 to control an amount of power generated by wind power generator 202 based at least in part on the anticipated energy requirements and/or the anticipated electrical distribution load.

Figure 7:
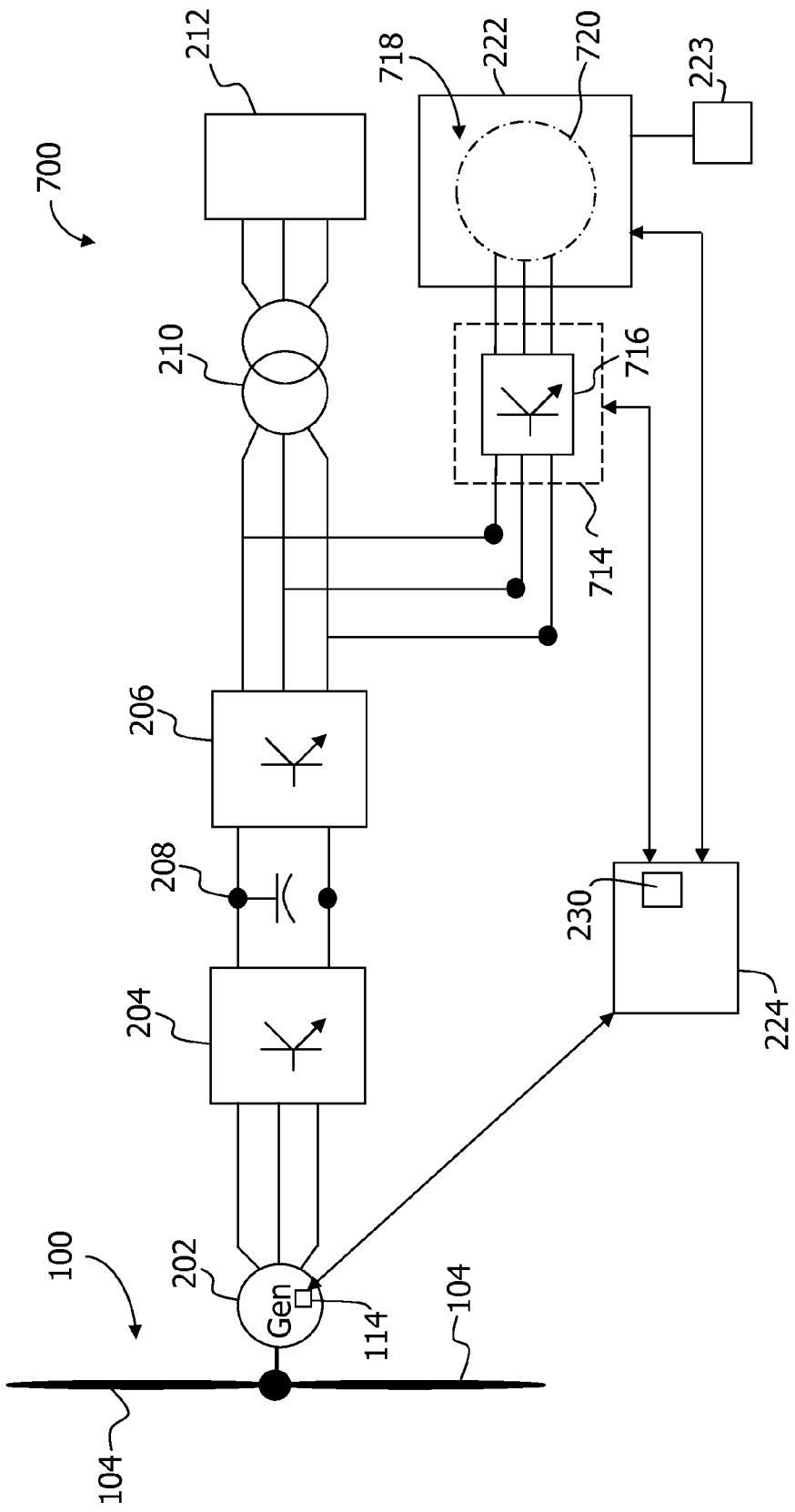
FIG. 7 is a schematic block diagram of an alternative exemplary wind power generation system.

FIG. 7 is a schematic block diagram of an alternative exemplary wind power generation system 700. Wind power generation system 700 includes at least some components that are similar to the components described above in reference to wind power generation system 200 and, therefore, are described herein and identified with similar component reference numbers in FIG. 7. Wind power generation system 700 includes one or more wind power generators 202 operatively coupled to or including, for example, one or more wind turbines 100, as a renewable power source. AC/DC converter 204 is electrically coupled to wind power generator 202. DC/AC converter 206 is electrically coupled to AC/DC converter 204. DC link 208 is electrically coupled to wind power generator 202 and coupled between AC/DC converter 204 and DC/AC converter 206. DC/AC converter 206 is electrically coupled to transformer 210 which is electrically coupled to electrical grid 212 described above. A pump load 714 including a bi-directional DC-AC converter 716 is electrically coupled to wind power generator 202 and coupled between DC/AC converter 206 and transformer 210. Pump load 714 is configured to supply power to a load 718. In the exemplary embodiment, load 718 includes an AC motor 720 located at waste management site 222, such as a remotely located waste management plant or facility. In one embodiment, wind power generation system 700 includes thermal energy storage device 223 configured to store excess energy not required by pump load 714.

In the alternative exemplary embodiment, wind power generator 202 generates a first AC voltage. AC-DC converter 204 converts the first AC voltage to a first DC voltage. DC/AC converter 206 converts a portion of the first DC voltage from AC/DC converter 204 to a second AC voltage. At least a portion of the second AC voltage is transmitted to electrical grid 212 through transformer 210. Bi-directional DC-AC converter 716 converts a portion of the second AC voltage from DC/AC converter 206 to a third AC voltage. The third AC voltage is then transmitted to AC motor 720. In this embodiment, bi-directional DC-AC converter 716 is coupled downstream from DC/AC converter 206. In an alternative embodiment, the second AC voltage is transmitted to transformer 210 prior to being transmitted to electrical grid 212.

A suitable renewable power generation management system, namely wind power generation management system 224 is operatively coupled, such as in signal communication, with one or more wind power generators 202. Further, wind power generation management system 224 may be operatively coupled, such as in signal communication, with one or more additional components of wind power generation system 700, including electrical grid 212, pump load 714, and/or waste management site 222. Wind power generation management system 224 is configured to monitor and/or control operation of the one or more wind power generators 202, including corresponding wind turbines 100, collectively or independently, for example to supply sufficient power to pump load 714. Wind power generation management system 224 includes controller 230 that is coupled to each wind power generator 202. In alternative embodiments, controller 230 is directly or indirectly coupled to one or more components of wind power generation system 700.

In one embodiment, wind power generation system 700 is configured to utilize excess energy generated by wind power generation system 700 to treat organic waste material to generate crude oil, as described above with reference to wind power generation system 200. Pump load 714 is operatively coupled to wind power generators 202 and is configured to receive the excess energy generated by wind power generators 202. Controller 230 is programmed to receive operational data and monitor and/or control operation of wind power generation system 700.

Figure 8:
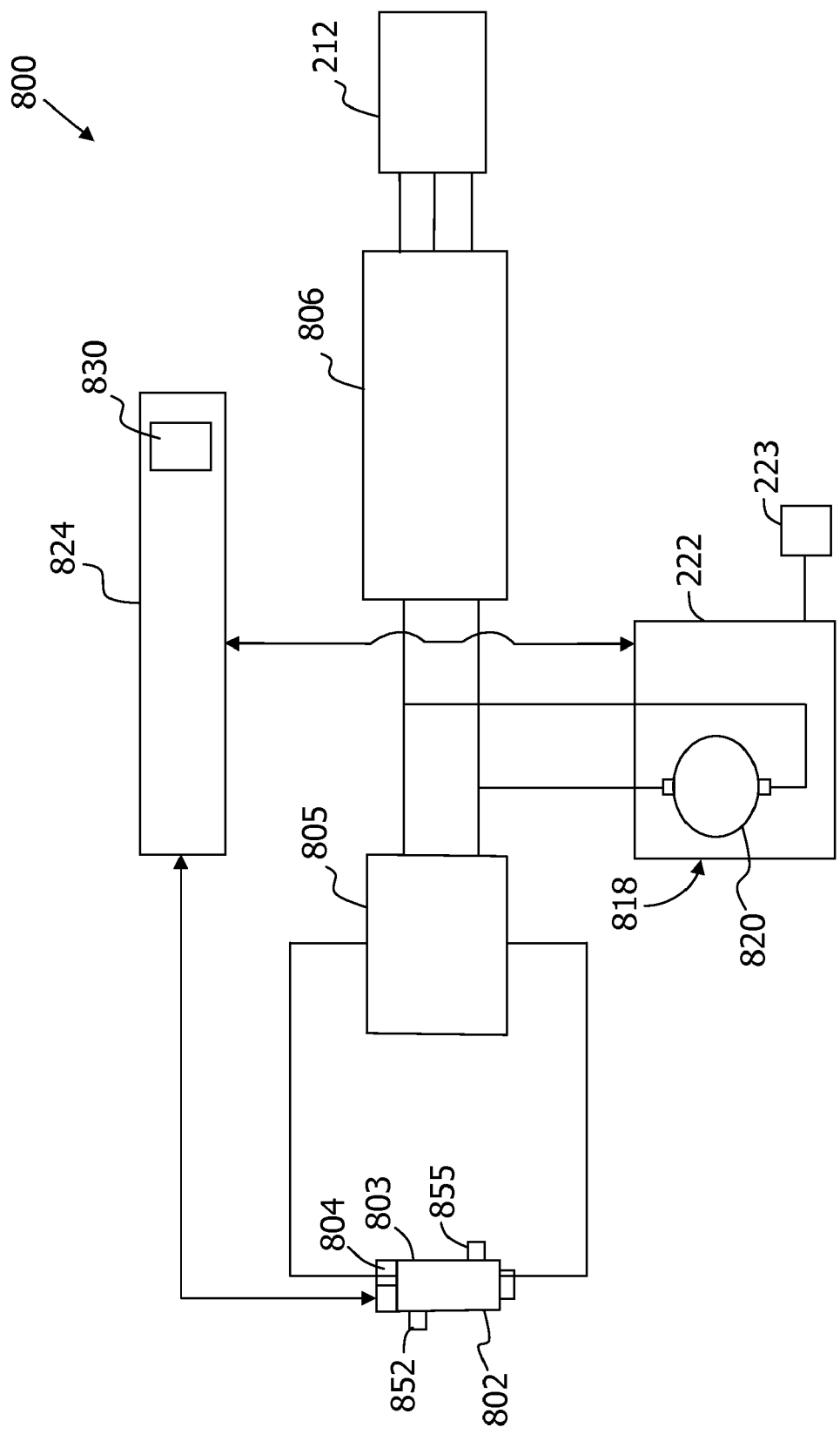
FIG. 8 is a schematic block diagram of an exemplary solar power generation system.

FIG. 8 is a schematic block diagram of an exemplary renewable power generation system, namely a solar power generation system 800. Solar power generation system 800 includes at least some components that are similar to the components described above in reference to wind power generation system 200 and, therefore, are described herein and identified with similar component reference numbers in FIG. 8. In one embodiment, solar power generation system 800 includes one or more solar power generators 802 that include one or more solar panels or photovoltaic cells 803. Solar power generator 802 is provided to generate a DC voltage utilizing solar energy. More specifically, in one embodiment, each solar power generator 802 includes a local control system 804 operatively coupled to photovoltaic cells 803.

Figure 9:
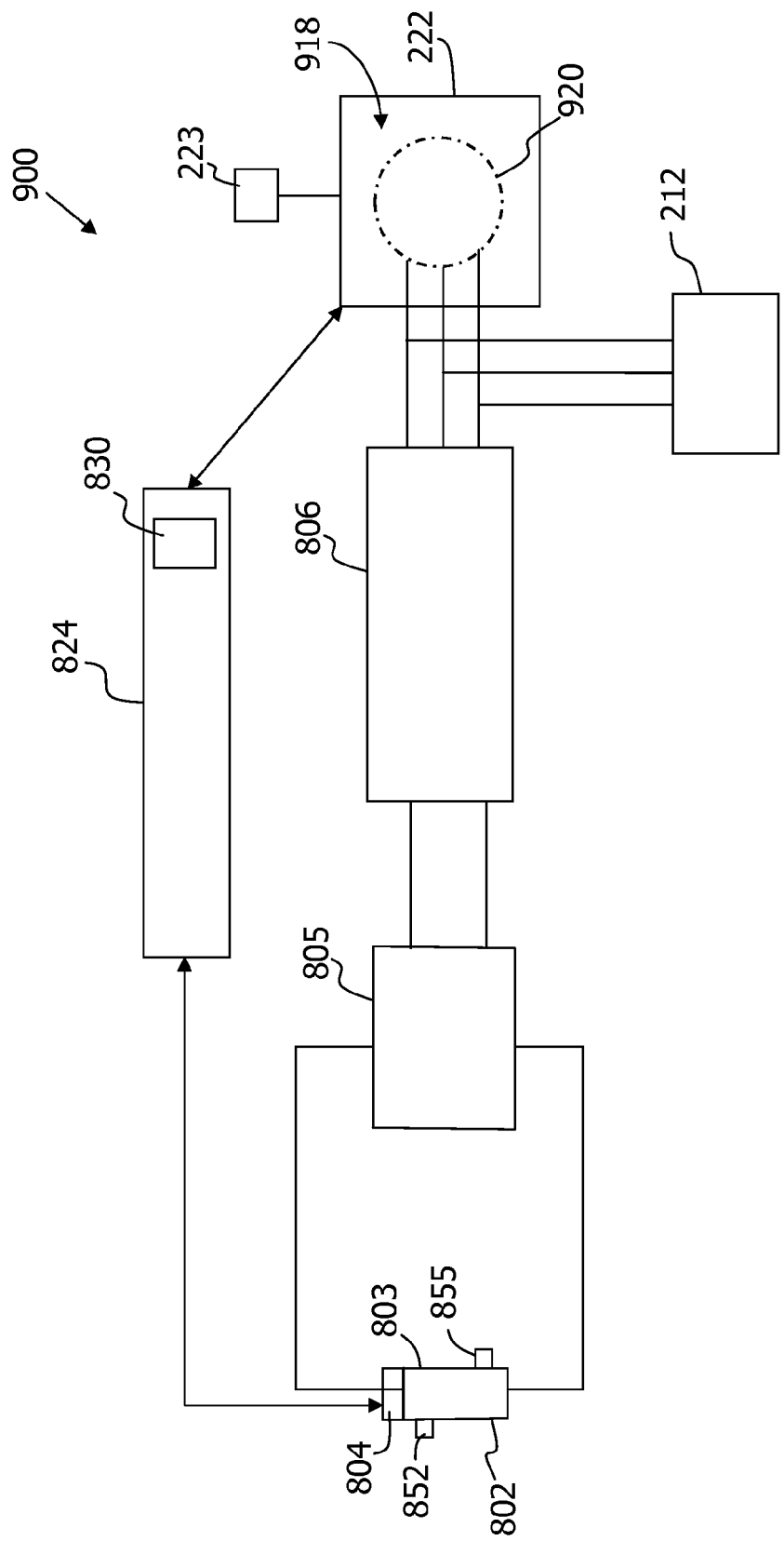
FIG. 9 is a schematic block diagram of an alternative exemplary solar power generation system.

In the exemplary embodiment, each solar power generator 802 includes control system 804, such as shown in FIGS. 8 and 9, that is operatively coupled, such as in signal communication, with solar power generation system 800 to facilitate controlling operation of corresponding solar power generator 802. Control system 804 includes a processor configured to perform the methods and/or steps described herein. Further, the processor and/or control system 804 can also include memory, input channels, and/or output channels.

Control system 804 is operatively coupled to one or more components of solar power generator 802, such as in operational control communication, to monitor and/or control operation of solar power generator 802. Control system 804 includes one or more sensors that are configured to measure environmental and climate conditions, as well as operational conditions of solar power generator 802, for example. The sensors provide feedback of the measured environmental and/or operational conditions to control system 804.

Photovoltaic cells 803 generate a DC voltage from solar energy received by solar power generator 802. A DC boost 805 is electrically coupled to each solar power generator 802. A DC/AC inverter 806 is electrically coupled to DC boost 805. Solar power generation system 800 is electrically coupled to a load 818. As shown in FIG. 8, load 818 includes a DC motor 820 located at waste management site 222, such as a remotely located waste management plant or facility. In one embodiment, DC motor 820 is coupled between DC boost 805 and DC/AC inverter 806. DC motor 820 receives a portion of the boosted DC voltage from DC boost 805.

In this embodiment, solar power generator 802 generates a DC voltage. DC boost 805 is electrically coupled to solar power generator 802 and is configured to boost the DC voltage from solar power generator 802 to provide a boosted DC voltage. DC/AC inverter 806 inverts a portion of the boosted DC voltage from DC boost 805 to an AC voltage. At least a portion of the AC voltage is transmitted to electrical grid 212. In one embodiment, solar power generation system 800 includes a thermal energy storage device 223 configured to store excess energy not required by load 818.

In the exemplary embodiment, a suitable renewable power generation management system, namely a solar power generation management system 824 is operatively coupled, such as in signal communication, with one or more solar power generator 802. As shown in FIG. 8, solar power generation management system 824 is operatively coupled, such as in signal communication, with control system 804 of each solar power generator 802. Further, solar power generation management system 824 may be operatively coupled, such as in signal communication, with one or more additional components of solar power generation system 800, including electrical grid 212, load 818, and/or waste management site 222. Solar power generation management system 824 is configured to monitor and/or control operation of the one or more solar power generators 802, collectively or independently, for example to supply sufficient power to load 818. Solar power generation management system 824 includes a controller 830 that is operatively coupled to each solar power generator 802. In alternative embodiments, controller 830 is directly or indirectly coupled to one or more components of solar power generation system 800.

Referring further to FIG. 8, solar power generation system 800 is configured to utilize excess energy generated by solar power generation system 800 to treat organic waste material to generate crude oil. Solar power generation system 800 includes one or more solar power generator 802 configured to generate electrical energy. Load 818 is operatively coupled to solar power generator 802 and is configured to receive the excess energy generated by solar power generator 802. Controller 830 is programmed to receive operational data from load 818 related to current energy requirements and/or anticipated energy requirements at waste management site 222 for treating the organic waste material. Controller 830 is also programmed to receive operational data from electrical grid 212, operatively coupled to solar power generation system 800, related to a current electrical distribution load and/or an anticipated electrical distribution load.

Based at least in part on the anticipated energy requirements, controller 830 is programmed to determine an amount of excess energy to supply to load 818 to facilitate treating the organic waste material to generate crude oil. In a particular embodiment, controller 830 is further programmed to consider current loads, a load forecast, market conditions, current thermal energy storage, and/or thermal energy storage capacity to determine based at least in part on anticipated energy requirements an amount of excess energy to transmit to load 818. Controller 830 is further programmed to operate solar power generator 802 to generate electrical energy based at least in part on the anticipated energy requirements and the anticipated electrical distribution load. Controller 830 is further programmed to generate and transmit to each solar power generator 802 command signals to control an amount of electrical energy generated by each solar power generator 802 based at least in part on the anticipated energy requirements and the anticipated electrical distribution load.

In one embodiment, solar power generation system 800 includes solar power generation management system 824 having controller 830 for use in monitoring operation of each solar power generator 802. In the exemplary embodiment, controller 830 includes components similar to the components described in reference to wind power generation management system 224 described above in reference to FIG. 3. In a particular embodiment, data storage unit 238 (see FIG. 3) includes a supervisory control and data acquisition (SCADA) system configured to acquire operational data from solar power generation system 800 and/or one or more operating solar power generators 802 and transmit the acquired operational data to controller 830. Further, solar power generation management system 824 includes a database unit 240 (see FIG. 3) that stores and retrieves data based on requests received from controller 830 for data stored in one or more databases, such as in a historical data database, in an operational data database, and in a configuration database that includes configuration data for each solar power generator 802. A user interface device outputs data through a user output device and receives data through a user input device.

Moreover, in the exemplary embodiment, the operational data received by controller 830 from operating solar power generator 802 may include data from one or more sensors 855 and/or one or more programmable logic controllers (PLC) 852 each positioned on or with respect to solar power generator 802, such as measurements representative of the present operational status of various components of solar power generator 802. The operational data may include, without limitation, information or data related to current power generation and/or anticipated power generation, a number of operational solar power generator 802 within solar power generation system 800 available to generate useable electrical energy, a maximum power generation of each solar power generator 802 and/or of solar power generation system 800, heating requirements of solar power generator 802, cooling requirements of solar power generator 802, current climate conditions, and/or a climate conditions forecast, as well as a temperature of one or more solar power component, a power output of solar power generator 802, stresses or forces acting upon one or more solar power generator component, and/or any other suitable measurement.

In one embodiment, solar power generation management system 824 is configured to facilitate utilization of excess energy generated by solar power generation system 800 including solar power generator 802 to treat organic waste material to generate crude oil. During the treatment process of organic waste material, as described above, plastic waste material as well as other suitable organic waste material is cracked with microwave technology to produce crude oil that can be refined into useable fuel. In this embodiment, solar power generation management system 824 includes controller 830 programmed to receive operational data from load 818 operatively coupled to solar power generator 802. The operational data is related to current energy requirements and/or anticipated energy requirements for treating the organic waste material. Controller 830 is further programmed to receive operational data from electrical grid 212 operatively coupled to solar power generator 802. The operational data is related to a current electrical distribution load and/or an anticipated electrical distribution load. Controller 830 is programmed to determine, based at least in part on anticipated energy requirements, an amount of excess energy to supply to load 818 to facilitate treating the organic waste material to generate crude oil, and operate solar power generator 802 to generate electrical energy based at least in part on the anticipated energy requirements and/or the anticipated electrical distribution load. Controller 830 is further programmed to supply the determined amount of excess energy to load 818. Controller 830 is further programmed to consider current loads, a load forecast, market conditions, current thermal energy storage, and thermal energy storage capacity to determine based at least in part on anticipated energy requirements an amount of excess energy to transmit to load 818. Controller 830 then generates and transmits to one or more solar power generators 802 command signals to control an amount of power generated by each solar power generator 802 based at least in part on the anticipated energy requirements and the anticipated electrical distribution load.

FIG. 9 is a schematic block diagram of an alternative exemplary solar power generation system 900. Solar power generation system 900 includes at least some components that are similar to the components described above in reference to wind power generation system 200 and solar power generation system 800 and, therefore, are described herein and identified with similar component reference numbers in FIG. 9. Solar power generation system 900 includes one or more solar power generators 802 that include one or more solar panels or photovoltaic cells 803. Solar power generator 802 is provided to generate a DC voltage utilizing solar energy. More specifically, in one embodiment, each solar power generator 802 includes a local controller operatively coupled to photovoltaic cells 803. Photovoltaic cells 803 generate a DC voltage from solar energy received by solar power generator 802. DC boost 805 is electrically coupled to each solar power generator 802. DC/AC inverter 806 is electrically coupled to DC boost 805. Solar power generation system 900 is electrically coupled to a load 918. As shown in FIG. 9, load 918 includes an AC motor 920 located at waste management site 222, such as a remotely located waste management plant or facility.

In the embodiment shown in FIG. 9, solar power generator 802 generates a DC voltage. DC boost 805 is electrically coupled to solar power generator 802 and is configured to boost the DC voltage from solar power generator 802 to provide a boosted DC voltage. DC/AC inverter 806 inverts at least a portion of the boosted DC voltage from DC boost 805 to an AC voltage. At least a portion of the AC voltage is transmitted to electrical grid 212. In one embodiment, a portion of the AC voltage from DC/AC inverter 806 is transmitted to AC motor 920. AC motor 920 is coupled downstream of DC/AC inverter 806. In one embodiment, solar power generation system 900 includes a thermal energy storage device 223 configured to store excess energy not required by load 918.

A suitable renewable power generation management system, such as solar power generation management system 824 is operatively coupled, such as in signal communication, with one or more solar power generator 802 of solar power generation system 900. Further, solar power generation management system 824 may be operatively coupled, such as in signal communication, with one or more additional components of solar power generation system 900, including electrical grid 212, load 918, and/or waste management site 222. Solar power generation management system 824 is configured to monitor and/or control operation of the one or more solar power generators 802, collectively or independently, for example to supply sufficient power to load 918. Solar power generation management system 824 includes controller 830 that is coupled to each solar power generator 802. In alternative embodiments, controller 930 is directly or indirectly coupled to one or more components of solar power generation system 900.

Solar power generation system 900 is configured to utilize excess energy generated by solar power generation system 900 to treat organic waste material to generate crude oil. Solar power generation system 900 includes one or more solar power generator 802 configured to generate electrical energy. Load 918 is operatively coupled to solar power generator 802 and is configured to receive the excess energy generated by solar power generator 802. Controller 830 is programmed to receive operational data from load 918 related to current energy requirements and/or anticipated energy requirements at waste management site 222 for treating the organic waste material. Controller 830 is also programmed to receive operational data from electrical grid 212, operatively coupled to solar power generation system 900, related to a current electrical distribution load and/or an anticipated electrical distribution load.

Based at least in part on the anticipated energy requirements, controller 830 is programmed to determine an amount of excess energy to supply to load 918 to facilitate treating the organic waste material to generate crude oil. In a particular embodiment, controller 830 is further programmed to consider current loads, a load forecast, market conditions, current thermal energy storage, and/or thermal energy storage capacity to determine based at least in part on anticipated energy requirements an amount of excess energy to transmit to load 918. Controller 830 is further programmed to operate solar power generator 802 to generate electrical energy based at least in part on the anticipated energy requirements and the anticipated electrical distribution load. Controller 830 is further programmed to generate and transmit to each solar power generator 802 command signals to control an amount of electrical energy generated by each solar power generator 802 based at least in part on the anticipated energy requirements and the anticipated electrical distribution load.

In one embodiment, solar power generation system 900 includes solar power generation management system 824 having controller 830 for use in monitoring operation of each solar power generator 802.

As described herein, in one embodiment, a method is provided for using excess energy generated by a renewable power generation system including at least one renewable power generator to treat organic waste material to generate crude oil. A renewable power generation management system receives operational data from the renewable power generator as well as operational data from a pump load operatively coupled to the renewable power generator. The operational data from the renewable power generator may include data related to at least one of current power generation and anticipated power generation, a number of operational renewable power generators, a maximum power generation, heating requirements of the renewable power generator, cooling requirements of the renewable power generator, current climate conditions, and a climate conditions forecast. The operational data from the pump load includes information or data related to current energy requirements and/or anticipated energy requirements for treating the organic waste material including, without limitation, data related to a quantity of organic waste material, crude oil demand, waste disposal cost, electricity cost, and crude oil pricing. The renewable power generation management system also receives operational data from an electrical grid that is operatively coupled to the renewable power generator. The operational data received from the electrical grid includes information or data related to a current electrical distribution load and/or an anticipated electrical distribution load. The operational data from the electrical grid may also include data related to current climate conditions, a climate conditions forecast, a maximum capacity of the electrical grid, energy demands at peak hours and non-peak hours, energy demands at a selected time of day, and energy demands on a selected day.

Based at least in part on anticipated energy requirements, the renewable power generation management system determines an amount of excess energy to supply to the pump load to facilitate treating the organic waste material to generate crude oil. Consideration may be given to current loads, a load forecast, market conditions, current thermal energy storage, and/or thermal energy storage capacity. The renewable power generation system then supplies the determined amount of excess energy to the pump load. In particular embodiments, a bi-directional converter or a bi-directional inverter operatively coupled to the renewable power generator is operated to supply the determined amount of excess energy to the pump load. In these embodiments, the excess energy is converted to one of an AC voltage and a DC voltage utilizing one of the bi-directional converter and the bi-directional inverter before supplying the determined amount of excess energy to the pump load. Further, the renewable power generation management system is configured to generate and transmit one or more renewable power generators command signals to control an amount of power generated by the renewable power generators based at least in part on the anticipated energy requirements and the anticipated electrical distribution load.

To facilitate determining the amount of excess energy to supply to the pump load, the renewable power generation management system quantifies an amount of renewable power generated by the renewable power generator, determines whether the amount of renewable power generated exceeds the current electrical distribution load of the electrical grid, and if the amount of renewable power generated does not exceed the current electrical distribution load of the electrical grid, the renewable power generation management system supplies the amount of renewable power generated to the electrical grid. However, if the amount of renewable power generated exceeds the current electrical distribution load of the electrical grid, the renewable power generation management system quantifies an amount of energy required by the pump load and stores at a thermal energy storage device excess energy not required by the pump load.

Technical effects of the method, systems, and controller described herein include, for example: receiving at a renewable power generation management system operational data from the renewable power generator; receiving at the renewable power generation management system operational data from a pump load operatively coupled to the renewable power generator, the operational data related to at least one of current energy requirements and anticipated energy requirements for treating the organic waste material; receiving at the renewable power generation management system operational data from an electrical grid operatively coupled to the renewable power generator, the operational data related to at least one of a current electrical distribution load and an anticipated electrical distribution load; determining based at least in part on anticipated energy requirements an amount of excess energy to supply to the pump load to facilitate treating the organic waste material to generate crude oil; and supplying the determined amount of excess energy to the pump load.

As described herein, the loads may represent simple impedance loads, motor loads, or loads with power electronic interfaces, as well as energy storage devices such as batteries. In one embodiment, the load may include a system having a plastic feed stock configured to recycle waste plastic and produce oil crude. In one embodiment, the load is supplied with power to operate a microwave cracking facility. For example, it is estimated that a 20 ton microwave cracking facility requires about 100 to 150 Kilowatts of electricity. As such, a GE 1.5 megawatt (MW) wind turbine at 35% capacity factor can handle approximately 100 tons of oil crude production per day. In another embodiment, the waste plastics are reused as an energy source. Ultimately, the embodiments described herein efficiently use and/or store excess electricity generated by renewable energy sources, such as wind energy and solar energy that would otherwise be unused. Further, the embodiments described herein provide a low unit cost way to store and/or transport energy with high energy density utilizing a process that does not require any change to the current energy infrastructure while additionally solving an environmental problem of waste plastics.

As used herein, an element or step recited in the singular and proceeded with the word "a" or "an" should be understood as not excluding a plurality of the element or step, unless such an exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for using excess energy generated by a renewable power generation system including a renewable power generator to treat organic waste material to generate crude oil, said method comprising:
   providing a renewable power generation management system operatively coupled to the renewable power generation system;

receiving at the renewable power generation management system operational data from a pump load operatively coupled to the renewable power generator, the operational data related to at least one of current energy requirements and anticipated energy requirements for treating the organic waste material;

receiving at the renewable power generation management system operational data from an electrical grid operatively coupled to the renewable power generator, the operational data related to at least one of a current electrical distribution load and an anticipated electrical distribution load;

determining based at least in part on anticipated energy requirements an amount of excess energy to supply to the pump load to facilitate treating the organic waste material to generate crude oil;

supplying the determined amount of excess energy to the pump load; and generating microwave energy from the excess energy, and using the microwave energy to generate crude oil from the organic waste material.

2. The method in accordance with claim 1, further comprising receiving at the renewable power generation management system operational data from the renewable power generator related to at least one of current power generation and anticipated power generation, a number of operational renewable power generators, a maximum power generation, heating requirements of the renewable power generator, cooling requirements of the renewable power generator, current climate conditions, and a climate conditions forecast.

3. The method in accordance with claim 1, wherein receiving operational data from a pump load comprises receiving data related to at least one of current energy requirements and anticipated energy requirements, a quantity of organic waste material, crude oil demand, waste disposal cost, electricity cost, and crude oil pricing.

4. The method in accordance with claim 1, wherein receiving operational data from an electrical grid comprises receiving data related to current climate conditions, a climate conditions forecast, a maximum capacity of the electrical grid, energy demands at peak hours and non-peak hours, energy demands at a selected time of day, and energy demands on a selected day.

5. The method in accordance with claim 1, wherein determining based at least in part on anticipated energy requirements an amount of excess energy to supply to the pump load comprises:

quantifying an amount of renewable power generated by the renewable power generator;

determining whether the amount of renewable power generated exceeds the current electrical distribution load of the electrical grid; and, responsive to a determination that the amount of renewable power generated does not exceed the current electrical distribution load of the electrical grid, supplying the amount of renewable power generated to the electrical grid.

6. The method in accordance with claim 5, wherein, responsive to a determination that the amount of renewable power generated exceeds the current electrical distribution load of the electrical grid, said method further comprises quantifying an amount of energy required by the pump load.

7. The method in accordance with claim 6, further comprising storing at a thermal energy storage device excess energy not required by the pump load.

8. The method in accordance with claim 1, wherein determining based at least in part on anticipated energy requirements an amount of excess energy to transmit to the pump load comprises considering current loads, a load forecast, market conditions, current thermal energy storage, and thermal energy storage capacity.

9. The method in accordance with claim 1, wherein supplying the determined amount of excess energy to the pump load comprises operating one of a bi-directional converter and a bi-directional inverter operatively coupled to the renewable power generator to supply the determined amount of excess energy to the pump load.

10. The method of claim 9, further comprising converting the excess energy to one of an AC voltage and a DC voltage utilizing one of the bi-directional converter and the bi-directional inverter before supplying the determined amount of excess energy to the pump load.

11. The method in accordance with claim 1, further comprising generating and transmitting to the renewable power generator command signals to control an amount of power generated by the renewable power generator based at least in part on the anticipated energy requirements and the anticipated electrical distribution load.

12. A renewable power generation management system configured to facilitate utilization of excess energy generated by a renewable power generation system including a renewable power generator to treat organic waste material to generate crude oil, said renewable power generation management system comprising a controller programmed to:

receive operational data from a pump load operatively coupled to the renewable power generator, the operational data related to at least one of current energy requirements and anticipated energy requirements for treating the organic waste material;

receive operational data from an electrical grid operatively coupled to the renewable power generator, the operational data related to at least one of a current electrical distribution load and an anticipated electrical distribution load;

determine based at least in part on anticipated energy requirements an amount of excess energy to supply to the pump load to facilitate treating the organic waste material to generate crude oil;

operate the renewable power generator to generate power based at least in part on the anticipated energy requirements and the anticipated electrical distribution load; and operate the pump load and control generating microwave energy from the excess energy, the microwave energy used to generate crude oil from the organic waste material.

13. The renewable power generation management system in accordance with claim 12, wherein the controller is further programmed to supply the determined amount of excess energy to the pump load.

14. The renewable power generation management system in accordance with claim 12, wherein the controller is further programmed to operate one of a bi-directional converter and a bi-directional inverter operatively coupled to the renewable power generator to supply the determined amount of excess energy to the pump load.

15. The renewable power generation management system in accordance with claim 12, wherein the controller is further programmed to consider current loads, a load forecast, market conditions, current thermal energy storage, and thermal energy storage capacity to determine based at least in part on anticipated energy requirements an amount of excess energy to transmit to the pump load.

16. The renewable power generation management system in accordance with claim 12, wherein the controller is further programmed to generate and transmit to the renewable power generator command signals to control an amount of power generated by the renewable power generator based at least in part on the anticipated energy requirements and the anticipated electrical distribution load.

17. A renewable power generation system configured to utilize excess energy to treat organic waste material to generate crude oil, said renewable power generation system comprising:
- a renewable power generator configured to generate electrical energy;
- a pump load operatively coupled to the renewable power generator and configured to receive excess energy generated by the renewable power generator; and,
- a controller programmed to:
  - receive operational data from the pump load related to at least one of current energy requirements and anticipated energy requirements for treating the organic waste material;
  - receive operational data from an electrical grid operatively coupled to the renewable power generator related to at least one of a current electrical distribution load and an anticipated electrical distribution load;
  - determine based at least in part on anticipated energy requirements an amount of excess energy to supply to the pump load to facilitate treating the organic waste material to generate crude oil;
  - operate the renewable power generator to generate electrical energy based at least in part on the anticipated energy requirements and the anticipated electrical distribution load; and
  - operate the pump load and control generating microwave energy from the excess energy, the microwave energy used to generate crude oil from the organic waste material.

18. The renewable power generation system in accordance with claim 17, wherein the controller is further programmed to operate one of a bi-directional converter and a bi-directional inverter operatively coupled to the renewable power generator to supply the determined amount of excess energy to the pump load.

19. The renewable power generation system in accordance with claim 17, wherein the controller is further programmed to consider at least one of current loads, a load forecast, market conditions, current thermal energy storage, and thermal energy storage capacity to determine based at least in part on anticipated energy requirements an amount of excess energy to transmit to the pump load.

20. The renewable power generation system in accordance with claim 17, wherein the controller is further programmed to generate and transmit to the renewable power generator command signals to control an amount of electrical energy generated by the renewable power generator based at least in part on the anticipated energy requirements and the anticipated electrical distribution load.

* * * * *